United States Patent
Neumann et al.

(10) Patent No.: US 6,877,595 B2
(45) Date of Patent: Apr. 12, 2005

(54) FRICTION CLUTCH

(75) Inventors: Klaus Neumann, Niederwerrn (DE); Frank Hirschmann, Niederwerrn (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/631,638

(22) Filed: Jul. 31, 2003

(65) Prior Publication Data

US 2004/0060796 A1 Apr. 1, 2004

(30) Foreign Application Priority Data

Aug. 1, 2002 (DE) .......................................... 102 35 113
Jul. 7, 2003 (DE) .......................................... 103 30 537

(51) Int. Cl.[7] .............................................. F16D 13/22
(52) U.S. Cl. ................. 192/70.15; 192/107 R
(58) Field of Search ........................... 192/70.14, 70.15, 192/107 R

(56) References Cited

U.S. PATENT DOCUMENTS

| | | | | | |
|---|---|---|---|---|---|
| 3,548,988 | A | * | 12/1970 | Armstrong .............. | 192/107 R |
| 4,593,801 | A | * | 6/1986 | Takeuchi et al. ......... | 192/70.15 |
| 5,779,017 | A | * | 7/1998 | Kleifges et al. ........... | 192/52.6 |
| 6,415,899 | B1 | * | 7/2002 | Gochenour et al. ...... | 192/70.14 |

* cited by examiner

Primary Examiner—Saul Rodriguez
(74) Attorney, Agent, or Firm—Cohen, Pontani, Lieberman & Pavane

(57) ABSTRACT

A friction clutch for motor vehicles with a ring-shaped pressure plate with a more-or-less radially oriented, ring-shaped friction surface, which can be moved axially against a ring-shaped friction lining carried by a support plate. The ring-shaped friction surface consists of a radially inner, ring-shaped partial friction surface and an adjoining radially outer ring-shaped partial friction surface. The radially outer partial friction surface projects axially to a slight extent beyond the radially inner partial friction surface.

12 Claims, 3 Drawing Sheets

FRICTION CLUTCH

BACKGROUND OF THE INVENTION

1. Field of the Invention

The invention pertains to a friction clutch, especially for motor vehicles, with a ring-shaped pressure plate which has a more-or-less radially oriented ring-shaped friction surface which can be moved axially against an opposing friction surface of a friction lining, which is carried by a support plate.

2. Description of the Related Art

When the friction linings of these types of friction clutches are new and unused, they have a much lower coefficient of friction than they do after they are worn in. As a result, it is possible for a new friction lining to slip with respect to the pressure plate after the clutch is engaged, because the force being applied by the pressure plate against the friction lining and thus also the clutch actuating force are designed for the coefficient of friction of a worn-in friction lining. To compensate for the lower coefficient of friction of the as-yet unworn friction lining, the pressing force would have to be increased, which means that the driver would be required to exert an uncomfortably large amount of force to actuate the clutch, a force which is no longer necessary after the friction lining has been worn in.

So that the friction lining can be worn in more quickly, it is known that the pressure plate can be designed with a convexly projecting friction surface. At first, a linear friction surface is formed, which leads to a very high pressure per unit area and to pronounced wear. During heavy starting accelerations, the pressure plate heats up very quickly at the friction surface, which is very narrow at first. The pressure plate can be easily deformed by this heat.

SUMMARY OF THE INVENTION

The object of the invention is therefore to create a friction clutch of the type indicated above which is simple in design but which, even in the new state, ensures that the friction clutch can transmit the maximum amount of torque without the need to increase the pressing or actuating forces, and which also makes it possible for the friction lining to wear-in more quickly.

According to the invention, the friction surface or the opposing friction surface consists of a radially inner partial friction surface and an adjoining radially outer partial friction surface, where the radially outer partial friction surface projects axially by a slight amount beyond the radially inner partial friction surface.

As a result of this design, a new friction lining comes in contact first only with the radially outer partial friction surface. A flat, ring-shaped friction surface with a large mean friction radius thus goes immediately into action, as a result of which the pressure per unit area exerted by the friction lining against the pressure plate and thus the required actuating force does not become too high.

When the radially outer partial friction surface projects conically from the radially inner partial friction surface toward its own radially outer edge, the effective size of the outer partial friction surface increases continuously.

If the radially outer partial friction surface has a rounded transition or a transition in the form of a fillet to the radially inner partial friction surface, it will be impossible for an edge to form in the friction lining or in the friction surface in the area of the transition from the inner to the outer partial friction surface.

Once the outer partial friction surface on the pressure plate has been worn down into a flat plane, level with the inner partial friction surface, the friction lining can also be considered fully worn-in with a correspondingly higher coefficient of friction. The clutch now behaves like a normal clutch with a flat friction surface on the pressure plate. This state is also achieved even if the axially projecting partial friction surface has not been worn away or has been only incompletely worn away, if, as a result of wear, the opposing friction surface on the friction lining has assumed a complementary shape corresponding to that of the friction surface on the opposing pressure plate. The friction surface of the pressure plate is then in 2-dimensional contact over its entire radial dimension with the friction surface of the friction lining, as a result of which the pressing force is distributed over the entire radial width of the friction lining.

To achieve a rapid wearing-in of the outer partial friction surface, the outer partial friction surface projects axially by a distance of approximately 0.05–0.2 mm, and preferably of approximately 0.1 mm.

A sufficient degree of wearing-in accompanied by only a moderate increase in the pressure exerted per unit area is achieved when the outer partial friction surface constitutes approximately 10–20%, and preferably approximately 15%, of the total friction area.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
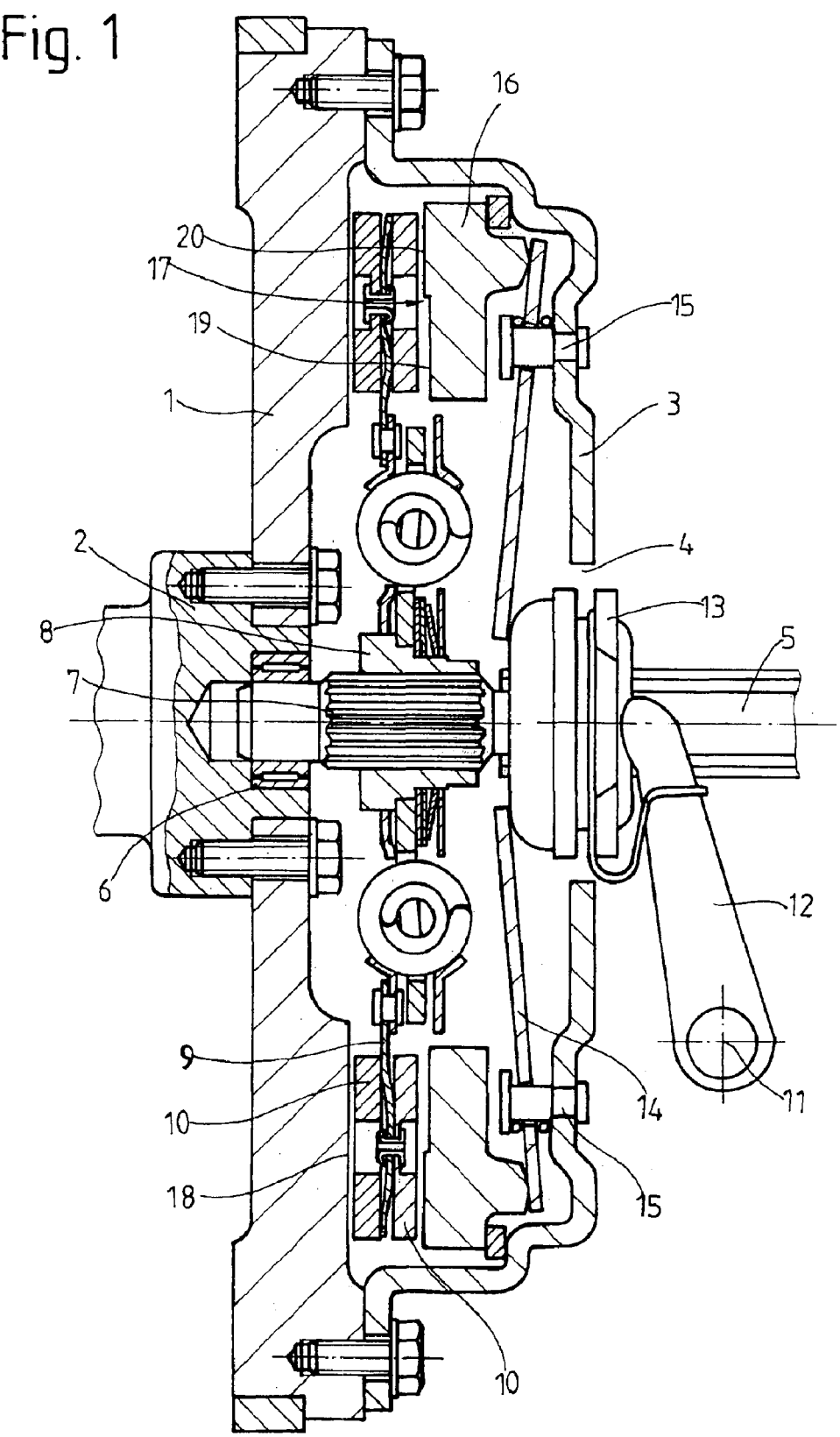
FIG. 1 is a cross-sectional of a friction clutch.

The friction clutch shown has a flywheel 1, which is mounted nonrotatably on a crankshaft 2. The radially outer edge of a clutch cover 3 is attached to the radially outer area of the flywheel 1.

A transmission input shaft 5 projects through a central opening 4 in the clutch cover 3. The free end of this shaft, i.e., the end facing the crankshaft 2, is supported rotatably in a bearing 6, mounted in the end of the crankshaft 2.

By means of an appropriately designed hub 8, a support plate 9 is mounted so that it cannot rotate but can slide in the axial direction on a section of the transmission drive shaft 5 designed as a splined shaft 7 located axially between the flywheel 1 and the clutch cover 3. The radially outer area of this plate carries the ring-shaped friction linings 10.

By way of a clutch-release fork 12, which can pivot about a pivot axis 11, a rotatable and axially movable clutch-release mechanism 13, which is supported on the transmission drive shaft 5, can be moved toward away from the radially inner area of a ring-shaped diaphragm spring 14. As a result, the plane of the diaphragm spring 14 pivots around a support, which bears against the middle area of the spring and which is attached to the clutch cover 3, the support consisting of spacer bolts 15. The radially outer area of the spring thus acts on a ring-shaped pressure plate 16, pushing it axially toward the flywheel 1.

As this happens, a ring-shaped friction surface 17 of the pressure plate 16 arrives in contact with one of the friction linings 10, which is attached by its rear surface to the support plate 9. By way of this support plate 9, this friction lining 10 exerts force axially on the other friction lining 10, pressing it against the ring-shaped friction surface 18 of the flywheel 1. Thus the two friction linings 10 are clamped between the pressure plate 16 and the flywheel 1, which is also acting as a pressure plate, and thus a nonrotatable connection is established between the crankshaft 2 and the transmission input shaft 5. In an alternative design, the support plate 9 can be designed as a so-called plate spring, which provides elasticity in the axial direction during the clutch-engaging and disengaging operations. As a result of this elastic resilience, the sprung support of the lining allows the friction linings 10 to engage more smoothly, in that the force being applied by the pressure plate 16 to the friction linings 10 increases or decreases—depending on whether the clutch is being engaged or disengaged—only gradually at first. In addition, the friction lining 10 in question can conform more effectively to the opposing friction surface, i.e., the pressure plate 16 or the flywheel 1, to compensate for any angular offset which may be present between the rotational axis of the transmission input shaft and the flywheel. The sprung support of the friction linings 10 also makes it possible for them to tilt with respect to their opposing friction surfaces. Thus, during the clutch-engaging operation, the pressing force can be distributed more uniformly over the active area, that is, over the axially projecting friction surface, which, in the present case, is the outer partial friction surface 20, and transmitted more effectively. The elastic design of the support plate 9 also makes it possible for the friction linings 10 to adapt their shape to that of their opposing friction surfaces of pressure plate 16 and flywheel 1. This is advantageous because it increases the percentage of the area of the friction lining 10 which comes in contact in the circumferential direction with the outer partial friction surface 20, especially at the beginning of the clutch-engaging process, and thus helps to prevent local overheating of the friction linings.

The friction surface 17 of the pressure plate 16 consists of a radially inner, ring-shaped partial friction surface 19 and, radially adjacent thereto, a radially outer ring-shaped partial friction surface 20. The outer partial friction surface 20 is designed to project axially beyond the inner partial friction surface 19 by about 0.1 mm toward the friction linings 10. To illustrate this, the axial projection of the outer surface beyond the inner partial friction surface 20 is exaggerated in FIG. 1.

Because the flywheel 1 with its friction surface 18 also acts as a pressure plate, it is obvious that this friction surface 18 can also be designed in the same way as the friction surface 17, that is, with an outer partial friction surface which projects axially beyond an inner partial friction surface toward the friction linings 10.

Figure 2:
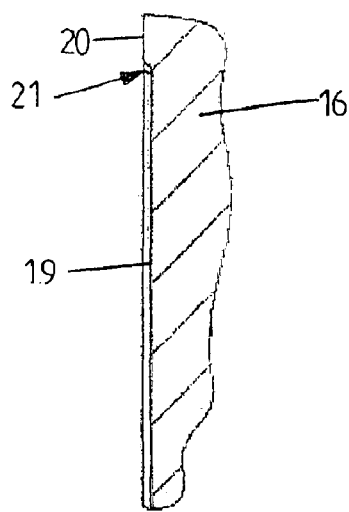
FIG. 2 is a partial section of the pressure plate.

FIG. 2 shows part of the pressure plate 16, in which the outer partial friction surface 20 adjoins the inner partial friction surface 19 by way of a transition area 21. The transition area 21 is advantageously designed here as a rounded area in the form of a fillet or a transition bevel. As the friction linings 10 wear down, they assume a shape complementary to that of their opposing friction surfaces; this transition area thus ensures that this complementarity will not result in any negative effect on the separation behavior of the friction linings 10 during the disengaging process. That is, when the friction lining 10 is lifted away from its opposing friction surface, represented here by the pressure plate 16, it will not have any tendency to stick or jam in the transition area 21.

The design of an axially projecting partial friction surface in the radially outer area is advantageous especially for new, as-yet-unworn friction linings 10. New, unused friction linings often have a smaller coefficient of friction $\mu$ than worn-in or partially worn friction linings. For this reason, the friction surfaces of friction linings are often lightly ground before they are installed in the friction clutch so that a higher coefficient of friction is available immediately. The friction clutch will then already have its full torque-transmitting capacity in the new state. In the case of the friction clutch according to the invention, it is the outer partial friction surface 20 of the pressure plate 16 which comes into contact first with the friction lining 10 during the clutch-engaging phase. Especially in the new state of the friction clutch, the pressing force is thus transmitted to the friction linings by way of the ring-shaped area formed by the outer partial friction surface 20. The so-called "mean friction diameter" increases. As the friction clutch continues in operation and the friction surfaces of the engaged friction linings 10 become worn-in, the coefficient of friction $\mu$ increases to the normal value. The invention can be put to especially advantageous use in friction clutches which must have an especially high torque transmission capacity as soon as they are used the first time or when they are new. This is true especially for the friction clutches used in racing, in which the one-time start at the beginning of the race represents a severe load on the clutch.

In the same way, of course, it is also possible to provide the previously described axially projecting partial friction surface 20 on the friction surface 18 of the flywheel 1 or possibly on the friction surface of a dual-mass flywheel. In this case, the reference number 16 in FIG. 2 should be replaced by the reference number 1.

To achieve an especially high transmission capacity in the new state of the friction clutch, it is proposed that an axially projecting, radially outer partial friction surface 20 according to the invention and a radially inner partial friction surface 19 be formed both on the pressure plate 16 and on the flywheel 1 or on a dual-mass flywheel. In the case of multi-disk clutches with several clutch disks arranged in an axial row and at least one or more intermediate disks between them, the embodiment of the friction surface 17 according to the invention with an outer partial friction surface 20 and an inner partial friction surface 19 can also be formed on the one or more intermediate disks. In this case, this embodiment can be realized either only on one of the friction surfaces of the intermediate disk or on both of its friction surfaces.

In addition, the friction clutch according to the invention can also be realized with friction linings 10 which belong to the group of the "organic" friction linings. This is advantageous especially for obtaining a smooth clutch-engaging behavior and for meeting high demands on riding comfort.

Figure 3:
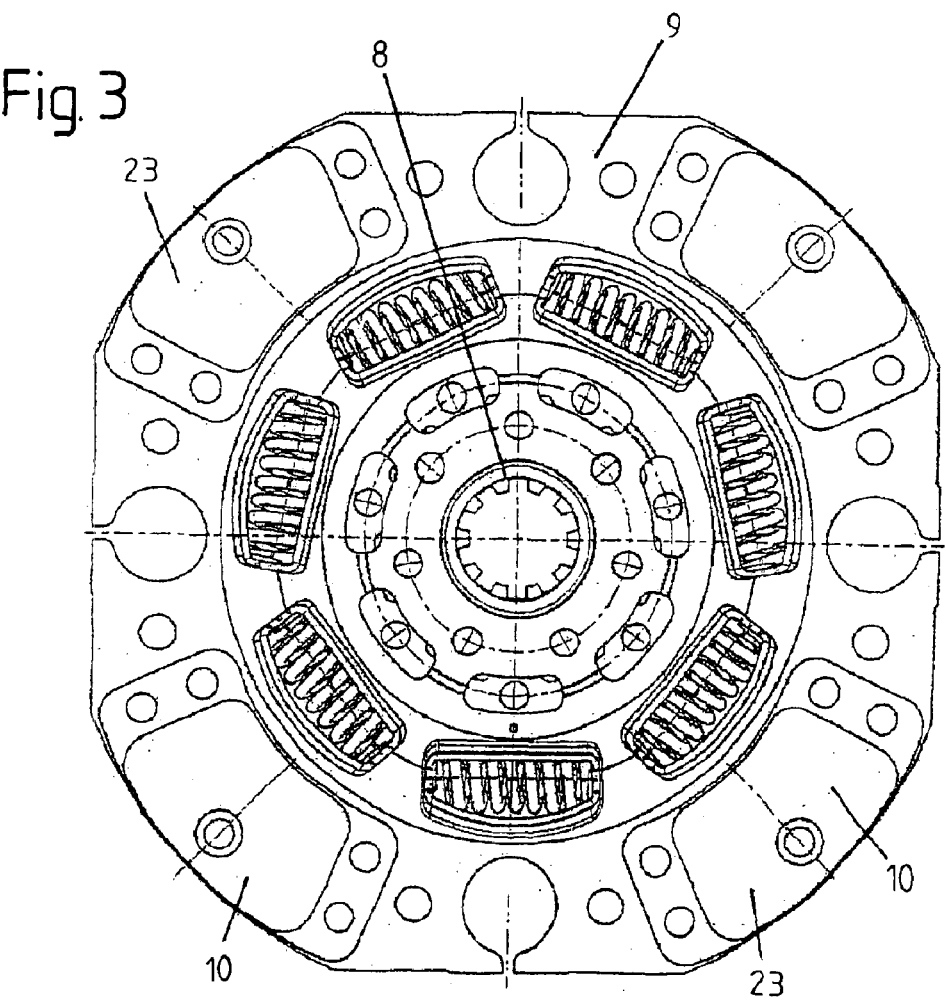
FIG. 3 is a plan view of an alternative clutch disk.

FIG. 3 shows an alternative clutch disk, in which the friction lining 10 is a so-called sintered lining, which is assembled from individual friction pads 23, riveted to the support plate 9. It is also possible here to use linings of ceramic, carbon, or a glass base material instead of the sintered linings. Because of their greater heat resistance, linings of this type are more suitable for use in cases where the clutch-engaging process extends over a prolonged period and the clutch is therefore slipping for a long time. Such linings are usually harder and stiffer than organic friction linings. Here it is often sufficient for the associated outer partial friction surface 20 of the opposing friction surface on the pressure plate 16, on the flywheel 1, or on an intermediate plate to project only slightly in the axial direction. According to the invention, it is proposed in this case that an axial projection of 0.1 mm or even of only 0.05 mm be provided.

According to another embodiment of the invention, the radially outer partial area of the friction linings 10 are provided with an axial projection on the order of the proposed 0.05–0.2 mm. When in this case the friction linings are in the form of rings, as friction linings of the organic type often are, the axial projection provided radially on the outside can, according to the invention, be in the form of a continuous circular ring, which can be interrupted merely by radial grooves, which help to cool the lining, or by recesses, which are provided to accommodate the heads of the rivets. In a further elaboration of the invention, the transition between the axially projecting partial friction surface of the friction lining and the inner surface can be designed here also as a rounded area or as a transition bevel, the primary reason for this being here to facilitate the removal of the ring from the mold during the production process in press molds.

It is also provided that the axially projecting, radially outer area of the friction lining constitutes approximately 10–20%, and preferably approximately 15%, of the surface area of the entire friction surface of each friction lining 10. In cases in which an especially large amount of torque is to be transmitted, it is advantageous for the radial dimension of the axially projecting area to be approximately 10% of the surface area of the friction lining.

Figure 4:
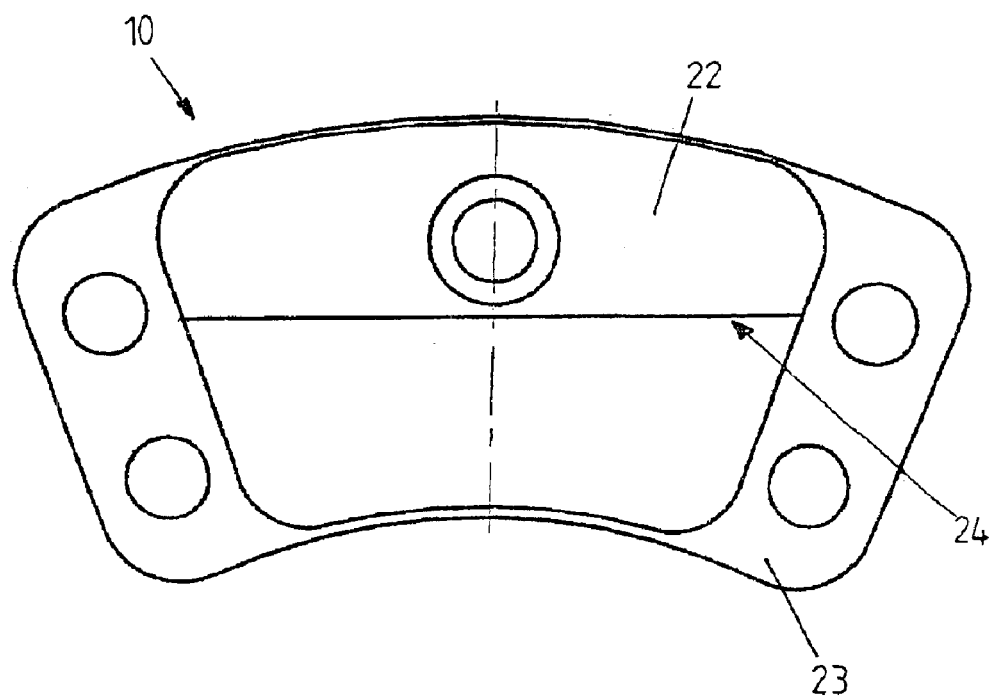
FIG. 4 is a detailed view of a friction lining.

It is also proposed that an axially projecting partial friction surface 22 be provided in the radially outer area of the friction surface of the friction lining when so-called friction pads 23 are used, that is, when a series of individual friction linings as shown in FIGS. 3 and 4 are mounted in a row around the circumference. An especially low-cost way of doing this is to design the transition 24 between the axially projecting partial friction surface 22 of the friction pad 23 and the inner part as a straight line as shown in FIG. 4. This lowers production costs. Friction linings, in which the axially projecting partial friction surface constitutes approximately 10–20%, and preferably about 15%, of the surface area of the entire friction surface of the individual friction lining, have proven to be especially suitable. To achieve a further increase in the torque-transmitting capacity, this axially projecting partial friction surface can constitute approximately 10% of the friction surface area decreasing the surface area increases the torque-transmitting capacity, because it increases the coefficient of friction.

For applications in which a high wear volume and a long service life are important in addition to the capacity to transmit an especially large amount of torque during the starting-off phase, it is proposed that an outer partial friction surface 20 be formed not only on the pressure plate 16 but also on the flywheel 1 and possibly on both sides of the intermediate disk. The presence of axial projections all along the route from one side to the other reinforces the effect of concentrating the pressing force in the radially outer friction surface.

When the axially projecting outer partial friction surface 20 according to the invention on the pressure plate and/or on the flywheel 1 and/or on a possibly present intermediate disk is combined with a correspondingly formed, radially outer partial surface projecting axially beyond the friction surface of the friction lining 10 or of the friction linings 10, the length of time which this increase in the torque-transmitting capacity according to the invention lasts can be extended correspondingly even as the wear of the friction linings progresses. It is advantageous for the parts of the axially projecting radially outer partial friction surface 20 on the pressure plate 16 and/or on the flywheel 1 and/or on a possibly present intermediate disk to be congruent with the axially projecting partial friction surfaces of the friction linings 10. This combination is possible with both organic and inorganic friction linings such as sintered linings or linings of carbon, ceramic, or glass. This combination can be used especially in cases where new friction linings 10 without lightly preground surfaces have a smaller coefficient of friction $\mu$ than ground friction surfaces do, that is, friction surfaces which have already been worn-in to some extent, and where a considerable amount of wear is required to increase the coefficient of friction $\mu$ of the friction lining 10. This is advantageous, for example, when the release agent which is used to prevent the friction lining from adhering to the production mold penetrates during production into deeper layers of the friction lining, where it has the effect of reducing the lining's coefficient of friction. It is therefore possible, especially in combination with a so-called sprung support of the lining, to subject the friction clutch to maximum load without any reduction in its torque-transmitting capacity as the friction lining gradually wears away and thus adapts to the worn-in state.

In another application, the projecting design in a new friction clutch according to the invention has the purpose of prolonging the service life of the clutch. The diaphragm spring 14 of a friction clutch can produce the required pressing force only over a limited pivot range. Within this pivot range, the force—distance curve of the engaged diaphragm spring 14 gradually increases from a minimum pressing force as the wear of the friction lining progresses to a maximum value and then decreases again gradually as the wear of the friction lining continues beyond that. The maximum point in its pivot range which the diaphragm spring 14 can occupy when engaged is reached when the pressing force has fallen to the specific minimum value at which sufficient torque-transmitting capacity is still present. This is the limit up to which the pressure plate 16 can be pressed toward the worn friction linings 10, which are becoming thinner and thinner, by the concomitant pivoting movement of the diaphragm spring 14. The course of the curve resembles that of a parabolic curve open toward the bottom. The presence of an axially projecting partial friction surface in the radially outer area of the friction lining 10 makes the friction lining thicker in the axial direction than it ordinarily would be when new. As a result of the now axially larger dimension of the friction linings 10, the diaphragm spring 14 is under greater pretension when the clutch is engaged. The force applied by the diaphragm spring 14 falls below the required minimum value, because it has been pivoted beyond the point it was designed for. Because the pressing force exerted via the pressure plate 16 is now being transmitted only in the radially outer partial area of the friction surface of the friction lining 10, however, the mean friction diameter has been increased, and the maximum amount of torque which can be transmitted is increased correspondingly. It must be remembered here that the mean friction diameter must increase by the same factor as that by which the pressing force decreases as a result of the greater degree of pretension of the diaphragm spring 14.

In this application according to the invention, it is also possible, of course, in correspondence with the previously described exemplary embodiments, to form an axially projecting outer partial friction surface 20 on the pressure plate 16 not by increasing the axial thickness of the pressure plate 16 but rather advantageously by removing material from the inner partial friction surface 19 and by simultaneously increasing to a corresponding extent the axial thickness of the friction linings 10 over the entire radial dimension of the friction surface. It is also possible to provide the previously described combination on the flywheel 1 or on an intermediate plate and additional friction linings 10 to bring about the same advantage.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A friction clutch comprising:
    a ring-shaped pressure plate having a radially oriented, ring-shaped friction surface; and
    a substantially planar support plate carrying a friction lining with a ring-shaped friction surface facing said friction surface of said pressure plate;
    wherein said friction surface of one of said pressure plate and said friction lining comprises a radially outer partial friction surface and a radially inner partial friction surface, said radially outer partial friction surface extending axially above said radially inner partial friction surface, whereby, in initial stages of wear of said friction lining, only said radially outer partial friction surface contacts the friction surface of the other said pressure plate and said friction lining.

2. A friction clutch as in claim 1 wherein said radially outer partial friction surface has a radially outer edge, said radially outer partial friction surface extending conically from said radially inner partial friction surface to said radially outer edge.

3. A friction clutch as in claim 1 wherein said radially outer partial friction surface is connected to said radially inner partial friction surface by a fillet.

4. A friction clutch as in claim 1 wherein said radially outer partial friction surface extends axially above said radially inner partial friction surface by 0.05 mm to 0.2 mm.

5. A friction clutch as in claim 4 wherein said radially outer partial friction surface extends axially above said radially inner partial friction surface by approximately 0.1 mm.

6. A friction clutch as in claim 1 wherein said radially outer partial friction surface has an area which is 10–20% of the area of said radially outer friction surface and said radially inner friction surface taken together.

7. A friction clutch as in claim 6 wherein said radially outer partial friction surface has an area which is approximately 15% of the area of said radially outer friction surface and said radially inner friction surface taken together.

8. A friction clutch as in claim 1 wherein said radially outer partial friction surface is on said pressure plate.

9. A friction clutch as in claim 1 wherein said radially outer partial friction surface is on said friction lining.

10. A friction clutch as in claim 1 wherein both said pressure plate and said friction lining comprise a radially outer partial friction surface and a radially inner partial friction surface, wherein both of said radially outer partial friction surfaces extend axially above the respective radially inner partial friction surfaces.

11. A friction clutch as in claim 1 wherein said friction lining comprises a plurality of circumferentially spaced friction pads.

12. A friction clutch as in claim 11 wherein the friction lining is a sintered lining.

* * * * *